Dec. 1, 1959 C. MONIN 2,915,645

MAGNETIC AMPLIFIER

Filed May 28, 1956 2 Sheets-Sheet 1

INVENTOR
CLAUDE MONIN

BY Paul M. Craig, Jr.
ATTORNEY.

Dec. 1, 1959 C. MONIN 2,915,645

MAGNETIC AMPLIFIER

Filed May 28, 1956 2 Sheets-Sheet 2

INVENTOR
CLAUDE MONIN
BY Paul M. Craig, Jr.
ATTORNEY.

United States Patent Office 2,915,645

Patented Dec. 1, 1959

2,915,645

MAGNETIC AMPLIFIER

Claude Monin, Paris, France, assignor to Compagnie Industrielle des Telephones, Paris, France, a corporation of France Application May 28, 1956, Serial No. 587,754

Claims priority, application France May 27, 1955

8 Claims. (Cl. 307—88)

This invention relates to a magnetostatic relay which may more particularly, but not exclusively, be utilised as control and memory device in automatic telephony and remote control. More particularly, the present invention relates to magnetostatic relays of the type which comprise a saturable magnetic core, a plurality of coils coupled to the core to obtain saturation thereof, the coils including at least one energizing coil connected in series with a rectifier and interconnected in an input circuit fed by an alternating current, and at least one control coil fed by a direct current source, and an output circuit delivering a rectified current.

Such relays may be advantageously used to replace the electromechanical relays in installations and apparatus which must exhibit certain memory characteristics and must be susceptible to respond to complex engaging conditions.

In the copending application Serial No. 516,574, filed July 20, 1955, an electromagnetic static arrangement has been described which comprises two saturable closed magnetic cores and a plurality of coils coupled thereto to obtain the saturation of the cores and combined with rectifiers to obtain a rectified output current. This copending application in particular disclosed an arrangement which enabled a rectified output current taking two predetermined values of which one is essentially zero while the other is essentially constant for a relatively weak variation in the control currents which are direct currents.

Magnetic amplifiers are already known, which comprise two magnetic circuits and in which the characteristic curve of the output current as a function of the control current is symmetrical with respect to the origin.

Magnetic amplifiers having the following features are also known: the feed circuit that is to say the circuit fed with alternating current, comprises a second inductance other than that wound around the saturable magnetic circuit, and a condenser is mounted in parallel with the portion of the feed circuit which comprises this second inductance and the load resistance.

Accordingly, it is an object of the present invention to provide a magnetostatic relay producing the same results as obtained in connection with a device as described in the aforementioned copending application Serial No. 516,574 which is more simple, involves fewer parts and, therefore, entails reduced cost of manufacture and assembly.

Another object of the present invention is to provide a magnetostatic relay having essentially two predetermined output current conditions and which utilizes only a single saturable magnetic core.

The device according to the invention comprises the above-mentioned second inductance and condenser. It comprises one saturable magnetic circuit only and the output current nevertheless assumes two different values, one of which is substantially nil and the other of which is not nil and substantially constant, according as the algebraic value of the control ampere-turns lies on either or the other side of a given interval.

In the magnetic relay according to the invention a conductor comprising in series a resistance and a second rectifier is arranged in parallel with the portion of the feed circuit which comprises the first inductance and the first rectifier, and a third rectifier is arranged in the feed circuit outside both mentioned sections connected in parallel, the second rectifier being mounted in the direction contrary to, and the third rectifier being mounted in the same direction as, that of the first rectifier.

Further objects, features and advantages of the present invention will become more obvious from the following description when taken in connection with the accompanying drawing which shows, for purposes of illustration only, one preferred embodiment in accordance with the present invention, and wherein:

Fig. 1 diagrammatically shows a relay according to the invention which comprises, besides the features above set forth, further features which will be stated hereinafter;

Figure 1:
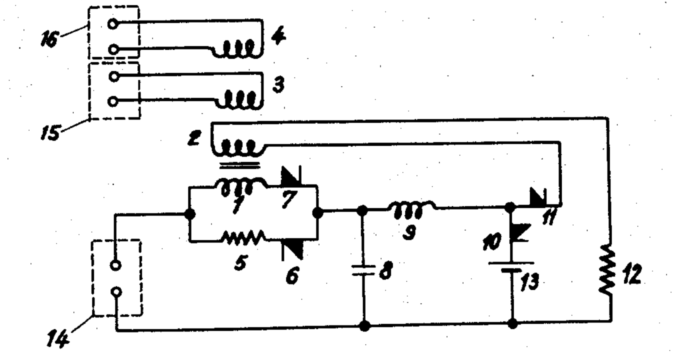

In Figure 1, windings 1, 2, 3 and 4 are wound on a common saturable magnetic circuit having a rectangular hysteresis cycle. The portion of the feed circuit which comprises the winding 1 and the rectifier 7 is in parallel with a conductor comprising the resistance 5 and the rectifier 6, the rectifiers 6 and 7 being arranged in opposition. The feed circuit of the amplifier is fed with alternating current from the constant-voltage source 14, and includes the second inductance 9, the third rectifier 11, arranged in the same direction as the first rectifier 7, and the load resistance 12. A condenser 8 is arranged in parallel with the section of the feed circuit which comprises the second inductance 9, the third rectifier 11 and the load resistance 12. The condenser 8 and inductance 9 form a filter means connecting the input and output circuits of the relay. The winding 2 is inserted in series with the rectifier 11 and the load resistance 12 and acts as a feedback winding. Connected in parallel with this section 11—2—12 is a rectifier 10 which is in series with a source 13 of direct voltage which is of constant magnitude U. The source 13 is of low internal impedance. The rectifier 10 and source 13 together form a limiting means which will be referred to hereinafter for limiting the current in load 12. The rectifier 11 acts as a threshold means which permits passage of current in the load 12 only when the potential at the terminals *g* and *h* (see Figure 4) reaches a predetermined value which may be termed the threshold value. The windings 3 and 4 which act as control windings are fed with direct current from sources 15 and 16 respectively. The number of such windings may vary as desired and is limited only by the possibilities of winding around the magnetic circuit. In any case, it is the algebraic sum $NcIc$ of the ampere-turns supplied by the control windings which take effect in the operation of the relay, and it will be assumed in the following, for the sake of simplicity, that there is only one control winding. The order of succession of the elements 11, 2 and 12 may also differ from that shown.

The winding 3 or 4 may be fed from a direct-current source such as 15 and 16 the electro-motive force of which is constant and produces a constant current in the winding associated therewith which is then called a polarising winding. The winding 3 or 4 can also be supplied with a current of variable strength and variable sign, and in particular consist of a winding connected in series with the load resistance 12 of a relay identical with that shown in Fig. 1.

Figure 2:
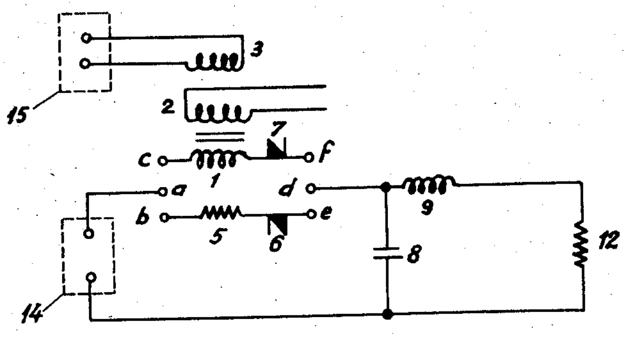
Figs. 2 and 4 are fragmentary diagrams which are taken from the complete diagram of Fig. 1 to enable the operation of the amplifier of Fig. 1 to be readily understood, and to show other embodiments of the invention.
Figure 3:
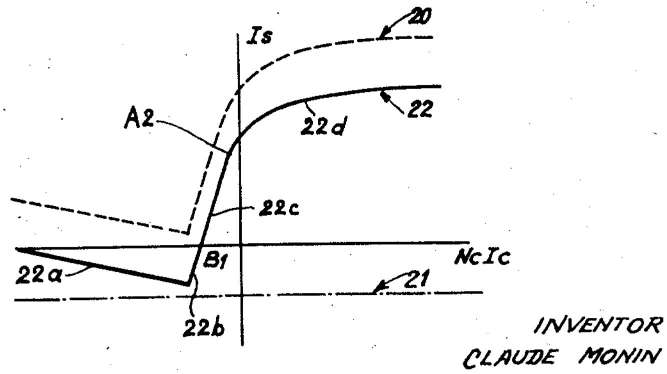
Figs. 3, 5, 6 and 7 are characteristic operating curves relating to Figures 1, 2 and 4.

The diagram of Figure 2 is an extract from the diagram of Figure 1. If the terminals *a* and *c*, on the one hand, and *d* and *f*, on the other hand, are connected together, the conventional diagram of a simplified self-exciting magnetic amplifier is obtained. The curve of the direct output current Is flowing through the resistance 12, as a function of the ampere-turns NcIc flowing through the winding 3, is illustrated in broken lines (curve 20) in Figure 3. If, on the contrary, the terminals *a* and *b*, on the one hand, and *d* and *e*, on the other hand, are connected, a conventional circuit arrangement for the rectification of an alternating current is obtained, which gives an output current through the resistance 12 which is independent of NcIc and which is represented by dots and dashes (curve 21) in Figure 3.

If the terminals *a*, *b* and *c*, on the one hand, and *d*, *e* and *f* on the other hand, are connected, the characteristic curve of the circuit arrangement is the resultant of the curves 20 and 21, that is to say, the curve 22. The curve 22 is derived from curve 20 by a displacement parallel to the axis of the ordinates, and intersects the axis of the abscissae at the point B1. This displacement is a function of the value of the resistance 5. The curve 22 consists of the four sections designated by the references 22*a*, 22*b*, 22*c* and 22*d*. The point A2, which separates section 22*c* from section 22*d*, will be defined hereinafter.

Figure 4:
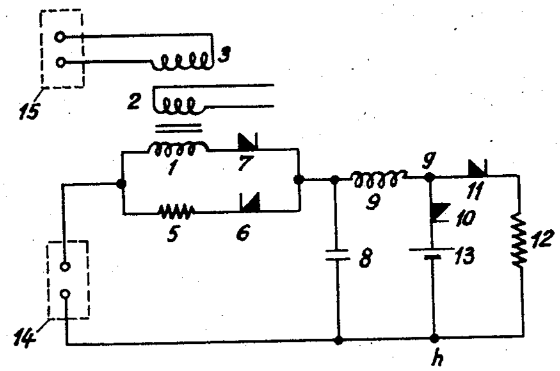

The diagram of Figure 4 is the same as that of Figure 2 except for the addition of elements 10, 11 and 13 of Figure 1. The rectifier 11 is connected in the same direction as the rectifier 7, so that the direct output current cannot pass through the resistance 12 when the potential of the point *g* is lower than that of the point *h*. When the potential of the point *g* is higher than that of the point *h*, the output current flows through the resistance 12 of the value R, but the presence of the rectifier 10 and of the source 13 of constant direct electromotive force U limits the current passing through 12 to the upper value $$I=\frac{U}{R}$$

In other words, the maximum potential across the load 12 during operation of the relay corresponds directly to the potential U of the source 13.

Figure 5:
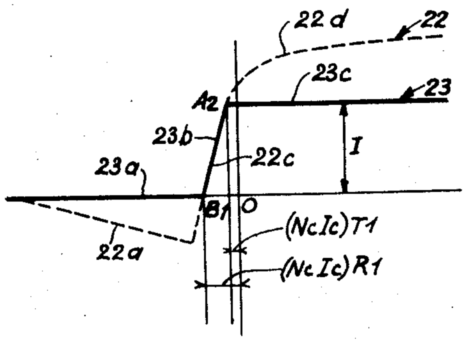

The characteristic curve 22, plotted in broken lines in Figure 5, then becomes the curve 23 which, to the left of the point B1 is identical with the axis of the abscissae ($Is=0$) and which to the right of the point A2 of the ordinate I is identical with the straight line $Is=I$. This curve 23 consists of the three sections designated by the references 23*a*, 22*c* and 23*b*. The portions 22*b* and 23*c* coincide.

It will readily be seen that if the device according to the above statement of invention does not include the source of current 13 and the rectifier 10, the characteristic curve consists of the sections 23*a*, 23*b* and 22*d*. Let us call (NcIc) R1 and (NcIc)T1 the numbers of control ampere-turns which correspond to points B1 and A2 respectively. For $NcIc<(NcIc)R1$ the current is substantially nil, whereas for $(NcIc)>T1$ it has a value which is different from nil and varies relatively little.

Figure 6:
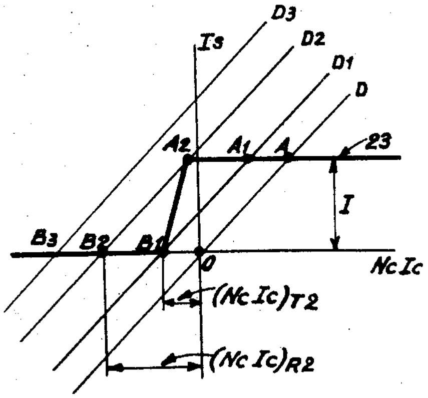

Referring now to the complete diagram of Figure 1, in which the feedback winding 2 is introduced in series with the load 12, the output current Is for $NcIc=0$ is given, as indicated in Figure 6, by the intersection A of the curve 23 with the feedback line D. The slope of the line D is defined by the ratio of the number of turns of the feedback winding 2 to the number of turns of the control winding 3. The characteristic operating point when NcIc is different from zero is given by the intersection of the curve 23 with a straight line derived from the straight line D by a displacement parallel to the axis of the abscissae and algebraically equal to NcIc. It will thus be seen that for $NcIc=(NcIc)T2$ the line D1 intersects the curve 23 at B1, A1, that for $NcIc=(NcIc)R2$ the line D2 intersects the curve 23 at B2 and A2, and that for $NcIc<(NcIc)R2$ there is only one possible point of intersection, for example B3. When the line D is situated between the lines D1 and D2, there are three possible points of intersection, but the centre point corresponds to an unstable state of equilibrium of the system.

Figure 7:
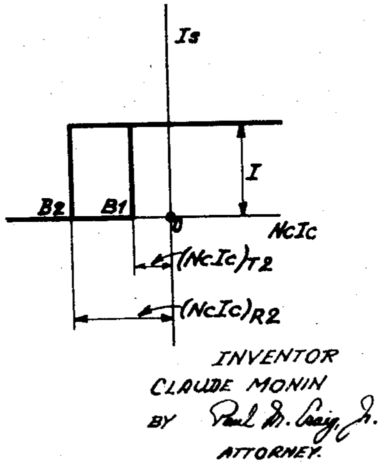

The resulting curve of Figure 7 is the characteristic curve proper of the relay, which to sum up:

(1) Supplies a zero output current for the control ampere-turns $NcIc<(NcIc)R2$.

(2) Supplies a constant output current of strength I for $NcIc>(NcIc)T2$.

(3) Supplies either a zero current or a constant current of strength I, depending upon whether NcIc has reached its value through increasing or discreasing values, for $(NcIc)R2<NcIc<(NcIc)T2$.

The point B1 corresponding to the value (NcIc)T2 and the point B2 corresponding to the value (NcIc)R2 are called respectively the rising or operating point and the falling or inoperative point.

If the magnetic amplifier comprises the feedback winding 2 but not the direct-current source 13 and the rectifier 10, the straight upper portion of curve 23 of Figure 6, which passes over points A2, A1 and A, is to be replaced by the curved portion 22*d* of curve 22 of Figure 5, and the upper straight line of Figure 7 is correspondingly replaced by a similar curved portion.

I claim:

1. A magnetostatic relay comprising input circuit means fed with alternating current, output circuit means including a load and supplying a rectified current, a saturable magnetic core, an energizing coil coupled to said core and connected in said input circuit means, a control coil coupled to said saturable magnetic core and controlled by direct current, a first rectifier connected in series with said energizing coil, circuit means comprising a resistance and a second rectifier connected across the terminals of the circuit including said energizing coil and said first rectifier, said second rectifier being operatively connected in the opposite sense to said first rectifier, means connecting said input and output circuits, and threshold means in said output circuit comprising a further rectifier that is operative in the same direction as said first rectifier.

2. A magnetostatic relay comprising input circuit means fed by alternating current, output circuit means supplying a rectified current and including a load, a saturable magnetic core, an energizing coil mounted on said core and connected in said input circuit means, a control coil mounted on said core and controlled by direct current, a first rectifier in series with said energizing coil, circuit means including a resistance and second rectifier connected to the terminals of a circuit including said energizing coil and said first rectifier, said two rectifiers being interconnected to be operative in opposite directions, and filter means connected between said input circuit means and said output circuit means.

3. A magnetostatic relay comprising input circuit means fed by alternating current, output circuit means supplying a rectified current and including a load, a saturable magnetic core, an energizing coil mounted on said core and connected in said input circuit means, a control coil mounted on said magnetic core and controlled by direct current, a first rectifier in series with said energizing coil, circuit means including a resistance and second rectifier connected across the terminals of a circuit including said energizing coil and said first rectifier, said rectifiers being interconnected to be operative in opposite directions, filter means connected between said input circuit means and said output circuit means, limiting means connected in said output circuit means, and threshold means also connected in said output circuit.

4. A magnetostatic relay according to claim 3, further comprising a feed-back coil mounted on said core and connected in said output circuit means.

5. A magnetostatic filter according to claim 4, wherein said filter means includes a coil connected in said output circuit and a condenser connected in parallel with said output circuit means.

6. A magnetostatic relay comprising input circuit means fed by alternating current, output circuit means supplying a rectified current and including a load, a magnetic saturable core, an energizing coil mounted on said core and connected in said input circuit means, a control coil mounted on said core and controlled by direct current, a first rectifier in series with said energizing coil, circuit means including a resistance and a second rectifier connected to the terminals of a circuit including said energizing coil and said first rectifier, said second rectifier being connected to be operative in the opposite direction from that of said first rectifier, filter means disposed between said input circuit means and said output circuit means, limiting means in said output circuit means including a source of direct current and a third rectifier connected in parallel with said output circuit means, threshold means in said output circuit means, and a feed-back coil mounted on said core and disposed in said output circuit means.

7. A magnetostatic relay comprising input circuit means fed by alternating current, output circuit means supplying rectified current and including a load, a saturable magnetic core, an energizing coil mounted on said core and connected in said input circuit means, a control coil mounted on said core and controlled by direct current, a first rectifier in series with said energizing coil, a circuit including a resistance and a second rectifier connected to the terminals of a circuit including said energizing coil and said first rectifier, said second rectifier being connected to be operative in the opposite direction from that of said first rectifier, filter means disposed between said input circuit means and said output circuit means, limiting means in said output circuit means, threshold means in said output circuit means including another rectifier disposed in said output circuit means, said last-mentioned rectifier being operative in the same direction of current flow as said first rectifier, and a feed-back coil mounted on said core and connected in said output circuit means.

8. A magnetostatic relay comprising input circuit means fed by alternating currents, output circuit means supplying rectified current and including a load, a saturable magnetic core, an energizing coil mounted on said core and connected in said input circuit means, a control coil mounted on said core and controlled by direct current, a first rectifier in series with said energizing coil, a circuit including a resistance and a second rectifier connected to the terminals of a circuit including said energizing coil and said first rectifier, said second rectifier being connected to be operative in the opposite sense of said rectifier, filter means between said input circuit means and said output circuit means including an inductance coil in said output circuit means and a condenser connected in parallel with said output circuit means, limiting means in said output circuit means including a direct current source and a third rectifier connected in parallel with said output circuit means, threshold means in said output circuit including a fourth rectifier in said output circuit means, said fourth rectifier being operative in the same direction as said first rectifier, and a feed-back coil in said output circuit means mounted on said core.

References Cited in the file of this patent

UNITED STATES PATENTS

| | | |
|---|---|---|
| Re. 24,068 | Geyger | Oct. 4, 1955 |
| 2,518,865 | Cartotto | Aug. 15, 1950 |
| 2,703,388 | McCreary | Mar. 1, 1955 |
| 2,780,770 | Lee | Feb. 5, 1957 |